United States Patent
Pepe

(10) Patent No.: US 7,325,980 B2
(45) Date of Patent: Feb. 5, 2008

(54) DUPLEX STYLE FIBER OPTIC CONNECTOR INTERFACE ASSEMBLY

(75) Inventor: Paul John Pepe, Clemmons, NC (US)

(73) Assignee: Tyco Electronics Corporation, Middletown, PA (US)

( * ) Notice: Subject to any disclaimer, the term of this patent is extended or adjusted under 35 U.S.C. 154(b) by 104 days.

(21) Appl. No.: 11/213,377

(22) Filed: Aug. 26, 2005

(65) Prior Publication Data
US 2007/0047877 A1 Mar. 1, 2007

(51) Int. Cl.
G02B 6/38 (2006.01)
G02B 6/36 (2006.01)

(52) U.S. Cl. .............................. 385/86; 385/76; 385/87; 385/55; 385/56; 385/58; 385/59; 385/60; 385/69

(58) Field of Classification Search ................... 385/53, 385/55, 56, 58, 59, 60, 70, 71, 72, 76, 77, 385/78, 84, 86, 136, 139, 100, 69
See application file for complete search history.

(56) References Cited

U.S. PATENT DOCUMENTS

| | | | |
|---|---|---|---|
| 4,184,742 A * | 1/1980 | Corrales | 385/78 |
| 4,787,706 A * | 11/1988 | Cannon et al. | 385/59 |
| 4,953,929 A * | 9/1990 | Basista et al. | 385/55 |
| 5,067,909 A | 11/1991 | Behning | 439/315 |
| 5,123,071 A * | 6/1992 | Mulholland et al. | 385/53 |
| 5,167,522 A | 12/1992 | Behning | 439/315 |
| 5,533,157 A * | 7/1996 | Coutts | 385/53 |
| 5,579,425 A * | 11/1996 | Lampert et al. | 385/59 |
| 5,675,682 A | 10/1997 | De Marchi | 385/77 |
| 6,409,392 B1 * | 6/2002 | Lampert et al. | 385/56 |
| 6,422,759 B1 | 7/2002 | Kevern | 385/60 |
| 6,443,627 B1 * | 9/2002 | Anderson et al. | 385/56 |
| 2006/0093282 A1 * | 5/2006 | Shepherd et al. | 385/90 |
| 2006/0159399 A1 * | 7/2006 | Erdman et al. | 385/53 |
| 2007/0047877 A1 * | 3/2007 | Pepe | 385/86 |

OTHER PUBLICATIONS

AMP Netconnect, Etherseal Connectivity System, www.ampnetconnect.com, chapter 14, pp. 223-227 (no date of publication).

* cited by examiner

Primary Examiner—Brian M. Healy

(57) ABSTRACT

A yoke member is provided for selective insertion into a passage of a first-half housing portion of a connector interface assembly, wherein the first-half housing portion is selectively matable with a complementary second-half housing portion. The yoke member includes a base wall; a pair of side walls; and an intermediate wall disposed between the side walls. The base wall, the pair of side walls and the intermediate wall define a pair of channels. A fiber optic connector is selectively positionable within each channel of the yoke member.

19 Claims, 9 Drawing Sheets

DUPLEX STYLE FIBER OPTIC CONNECTOR INTERFACE ASSEMBLY

BACKGROUND

1. Technical Field

The present disclosure relates to connector assemblies and, more particularly, to connector assemblies for use with and/or for supporting duplex style fiber optic connector assemblies and the like.

2. Background of Related Art

In the past, sealed connector assemblies for copper-based systems were broadly used for transmission of data and the like. Exemplary copper-based connector assemblies are disclosed in U.S. Pat. No. 5,067,909 or 5,167,522, each of which is assigned on its face to Alden Products Company, the entire contents of each of which being incorporated herein by reference.

However, recently, use of fiber optics and the like has increased due to greater rate of data transmission offered by fiber optic-based systems as compared to copper-based systems. In particular, optical fibers are used in data transmission applications because of their wide bandwidth and large capacity for carrying information in the form of light waves that are basically unaffected by electromagnetic fields. Some connectors are designed such that optical fibers are positioned within a ferrule that is, in turn, positioned within a connector housing. These ferrules may take any shape or configuration but they typically have a rectangular or circular cross-section.

While connector interface assemblies providing a sealed connection for copper-based systems exist, as described above, there is a need for connector interface assemblies which provide a sealed connection for fiber optic-based systems and the like.

SUMMARY

The present disclosure relates to connector assemblies. More particularly, the present disclosure is directed to connector assemblies for use with duplex style fiber optic connectors and the like.

According to an aspect of the present disclosure, a connector interface assembly for fiber optic cabling is provided. The connector interface assembly includes a first-half housing portion including a central body portion defining a passage therethrough; and a second-half housing portion selectively connectable to the first-half housing portion. The second-half housing portion includes a cylindrical body defining a passage therethrough. The cylindrical body is configured and dimensioned for receiving the central body portion of the first-half housing portion therein. The connector interface assembly further includes a duplex connector assembly selectively operatively supportable in the passage of the central body portion of the first-half housing portion. The duplex connector assembly includes a pair of fiber optic connectors, each connector including a connector body and being configured and adapted to terminate a fiber optic cable; and a yoke member configured and adapted to selectively support the pair of fiber optic connectors.

The yoke member may include a pair of channels each configured and dimensioned to selectively receive a fiber optic connector therein in a snap-fit engagement. Desirably, at least a portion of the yoke member is positionable in the passage of the central body portion of the first-half housing portion.

In an embodiment, a distal end portion of the fiber optic connectors is receivable in a corresponding complementary connector receptacle provided in the second-half housing portion. The connector interface assembly may further include a coupler operatively supported on the second-half housing portion; and a connector receptacle operatively supported in the coupler. Accordingly, a first end of the connector receptacle may be configured and adapted to selectively receive the fiber optic connectors therein upon mating of the first-half and second-half housing portions to one another. The first end of the connector receptacle is desirably disposed within the passage of the second-half housing portion.

Desirably, the first-half and second-half housing portions connect in a bayonet-type arrangement.

In accordance with another aspect of the present disclosure, in a connector interface assembly for fiber optic cabling, wherein the connector interface assembly includes a first-half housing portion selectively connectable with a complementary second-half housing portion, and wherein the first-half housing portion includes a central body portion defining a passage therethrough, the improvement includes a yoke member configured and adapted to selectively support a pair of fiber optic connectors. The yoke member is also configured and adapted for selective insertion into the passage of the central body portion.

The connector interface assembly may further include a duplex connector assembly selectively insertable into the passage of the central body portion. The duplex connector assembly includes the yoke member; and a pair of fiber optic connectors, each connector including a connector body and being configured and adapted to terminate a fiber optic cable. The yoke member desirably includes a pair of channels each configured and dimensioned to selectively receive a fiber optic connector therein in a snap-fit engagement.

In an embodiment a distal end portion of the fiber optic connectors is receivable in a corresponding complementary connector receptacle of the second-half housing portion. The yoke member desirably engages the passage of the central body portion in a snap-fit type engagement.

It is contemplated that at least a portion of the yoke member is positionable in the passage of the cylindrical body. The yoke member includes a base wall; a pair of side walls; and an intermediate wall disposed between the side walls. The base wall, the pair of side walls and the intermediate wall define a pair of channels. Accordingly, a fiber optic connector is selectively positionable within each channel of the yoke member.

The side walls and the intermediate wall may each include a rib for snap-fit engaging the fiber optic connector. The intermediate wall may include a stabilizer provided at an upper end thereof for engaging a complementary recess formed in the passage of the central body portion of the first-half housing portion.

A recess may be provided in the base wall of the yoke member for snap-fit engaging a detent formed in the passage of the central body portion of the first-half housing portion.

In accordance with a further aspect of the present disclosure, a yoke member is provided for selective insertion into a passage of a first-half housing portion of a connector interface assembly, wherein the first-half housing portion is selectively matable with a complementary second-half housing portion. The yoke member includes a base wall; a pair of side walls; and an intermediate wall disposed between the side walls. The base wall, the pair of side walls and the intermediate wall define a pair of channels. A fiber optic connector is selectively positionable within each channel of the yoke member.

The fiber optic connectors are desirably LC connectors.

For a better understanding of the present invention and to show how it may be carried into effect, reference will now be made by way of example to the accompanying drawings.

DETAILED DESCRIPTION OF THE DRAWINGS

DETAILED DESCRIPTION OF THE EMBODIMENTS

Figure 1:
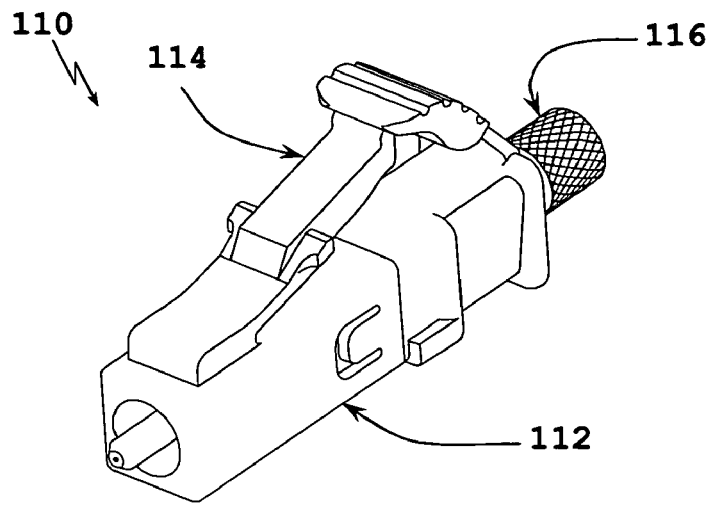
FIG. 1 is a perspective view of a prior art fiber optic LC connector.

Embodiments of the presently disclosed connector interface assembly will now be described in detail with reference to the drawing figures wherein like reference numerals identify similar or identical elements. As used herein and as is traditional, the term "distal" refers to that portion which is furthest from the user while the term "proximal" refers to that portion which is closest to the user. In addition, terms such as "above", "below", "forward", "rearward", etc. refer to the orientation of the figures or the direction of components and are simply used for convenience of description.

Figure 15:
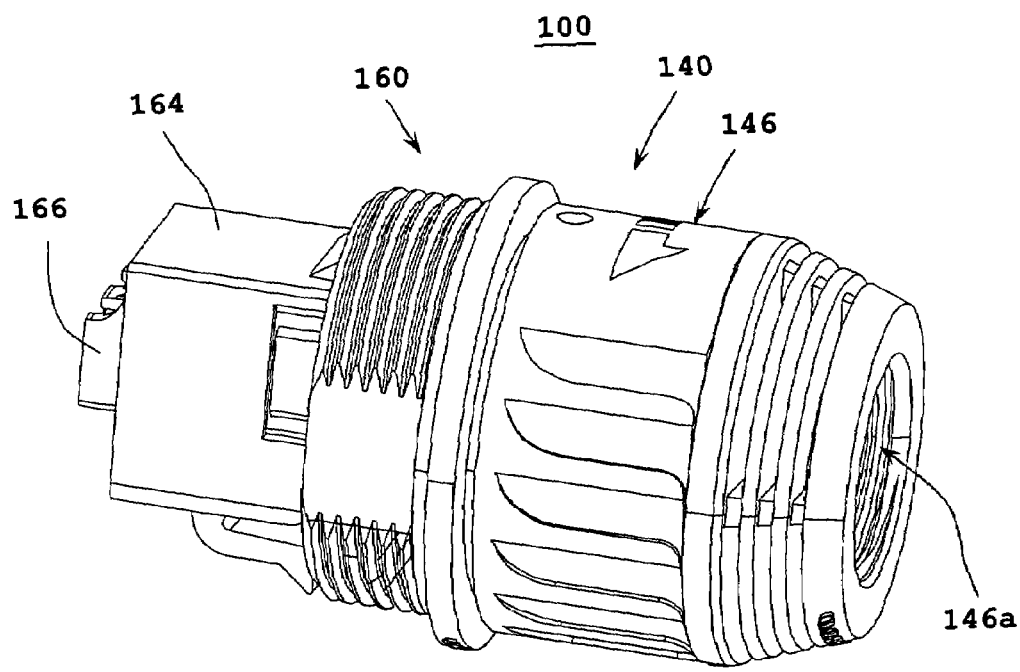
FIG. 15 is a perspective view of the connector interface assembly housing illustrating the first-half portion and the second-half portion operatively coupled to one another.
Figure 13:
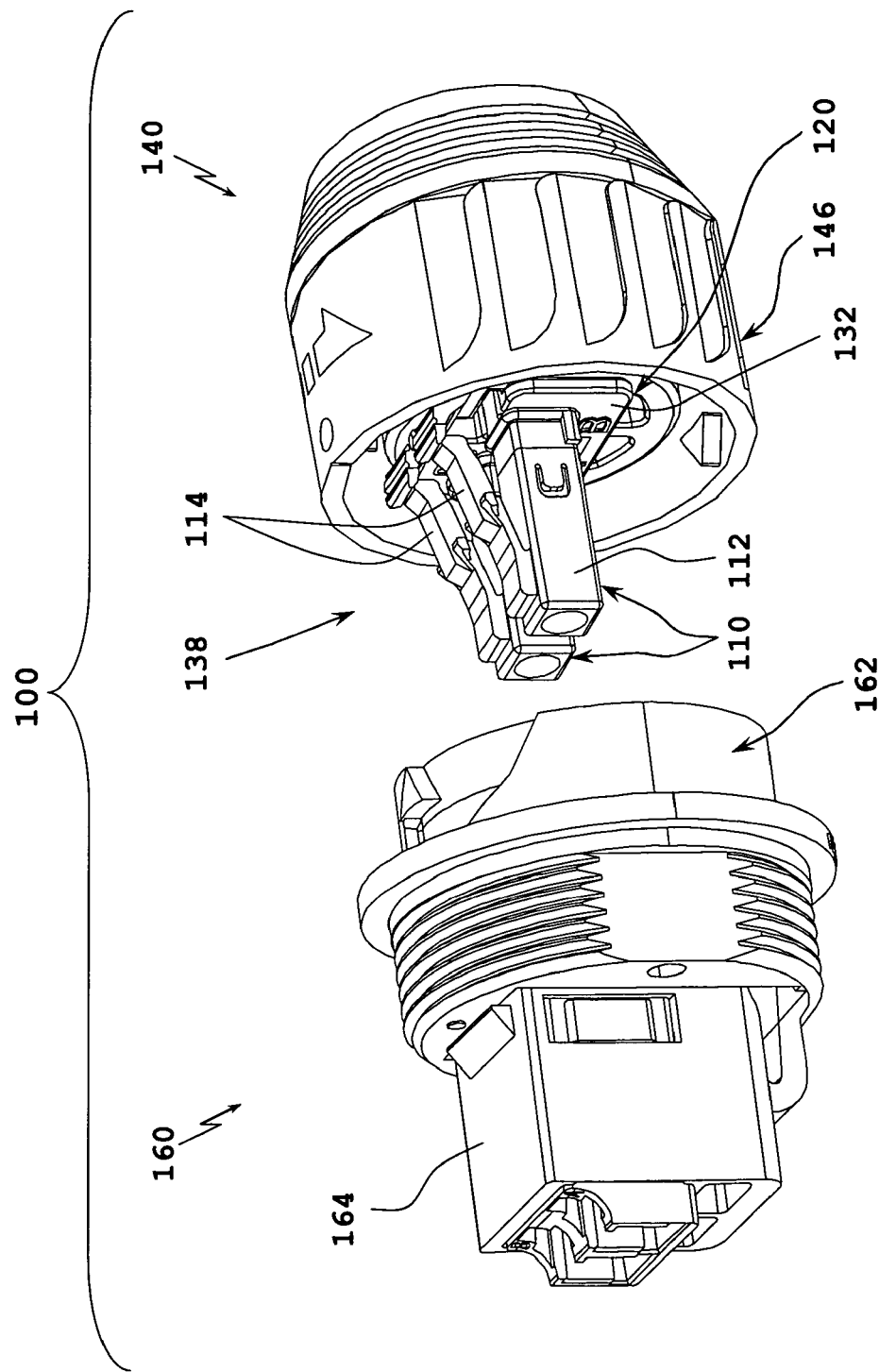
FIG. 13 is a perspective view illustrating the coupling of the first-half portion of the connector interface assembly housing to the second-half portion of the connector interface assembly housing.
Figure 14:
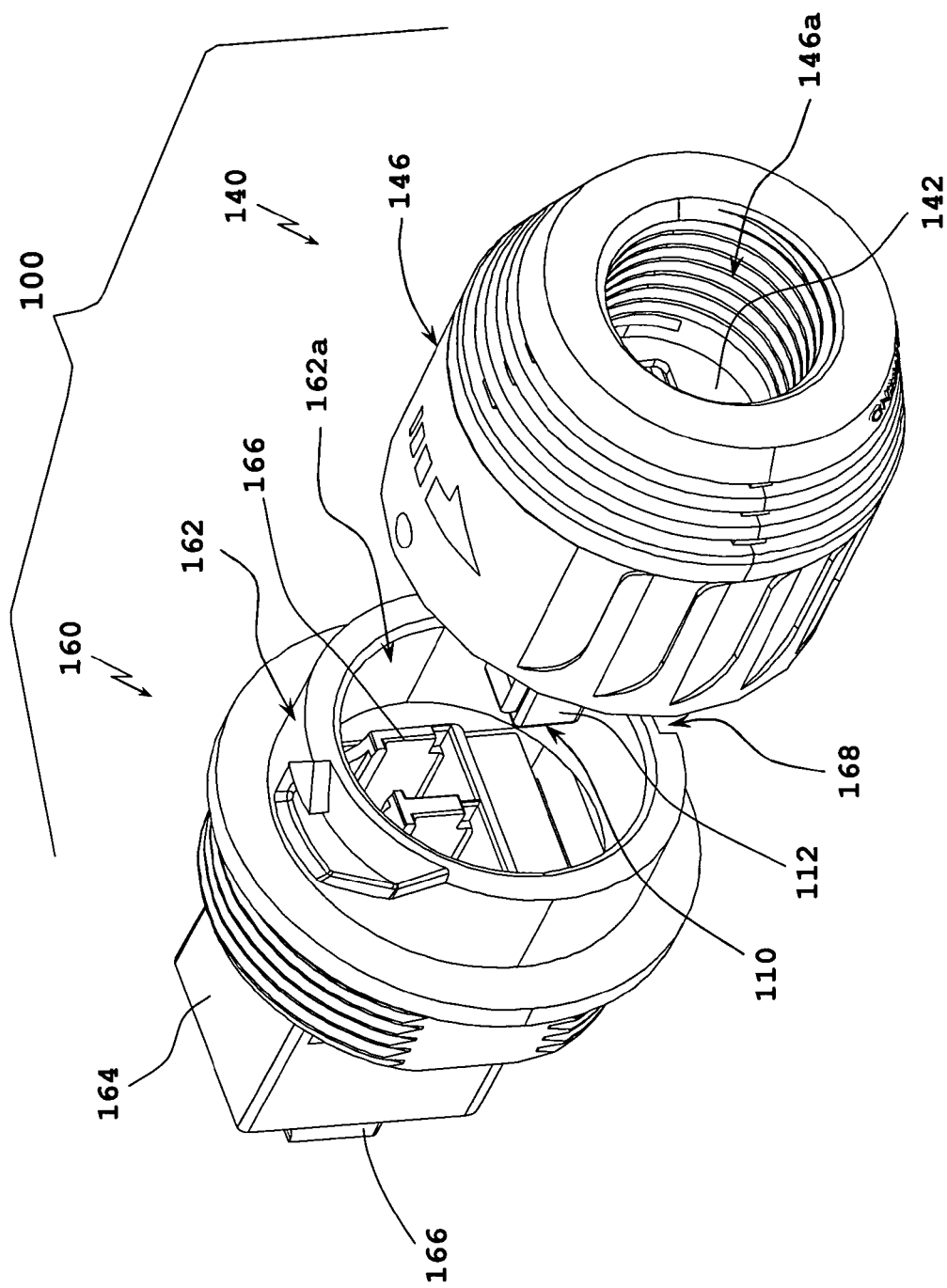
FIG. 14 is a further perspective view illustrating the coupling of the first-half portion of the connector interface assembly housing to the second-half portion of the connector interface assembly housing.

As seen in FIGS. 13-15 a connector interface assembly (e.g., electrical connector assembly, data connector assembly, telephonic connector assembly, etc.), is generally designated as 100. Connector interface assembly 100 includes a duplex connector assembly 138 having at least one LC connector 110 (preferably a pair of LC connectors 110) supported therein, a first-half housing portion 140 of connector interface assembly 100 supporting the duplex connector assembly 138, and a second-half housing portion 160 of the connector interface assembly 100 supporting a coupler 164.

Figure 2:
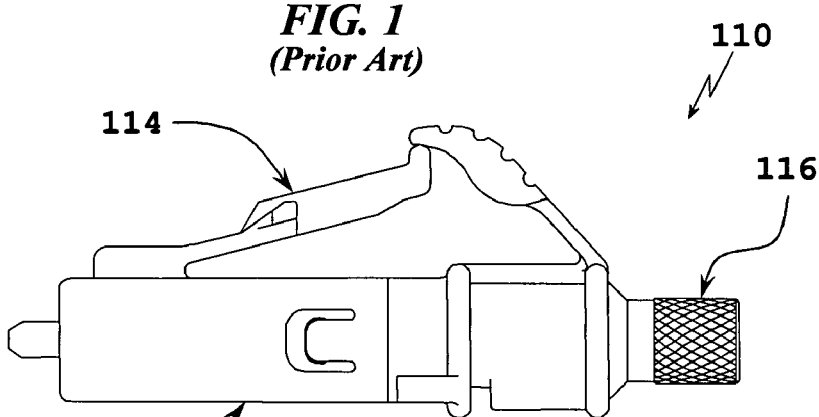
FIG. 2 is a side elevational view of the prior art LC connector of FIG. 1.
Figure 3:
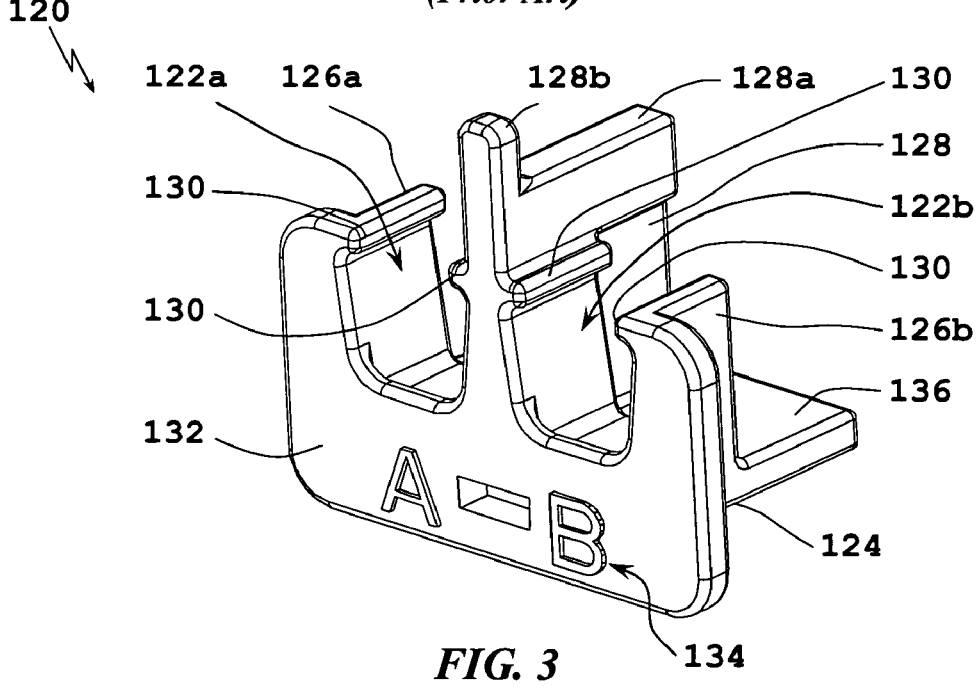
FIG. 3 is a front, top perspective view of a yoke member, according to an embodiment of the present disclosure, for supporting a pair of LC connectors, as shown in FIGS. 1-2, therein in a duplex arrangement.
Figure 4:
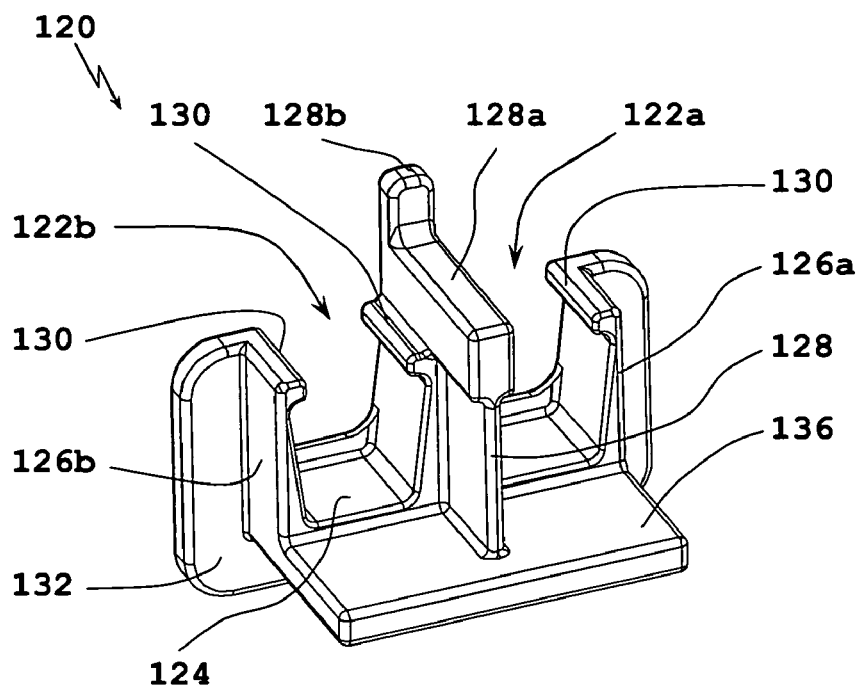
FIG. 4 is a rear, top perspective view of the yoke member of FIG. 3.
Figure 5:
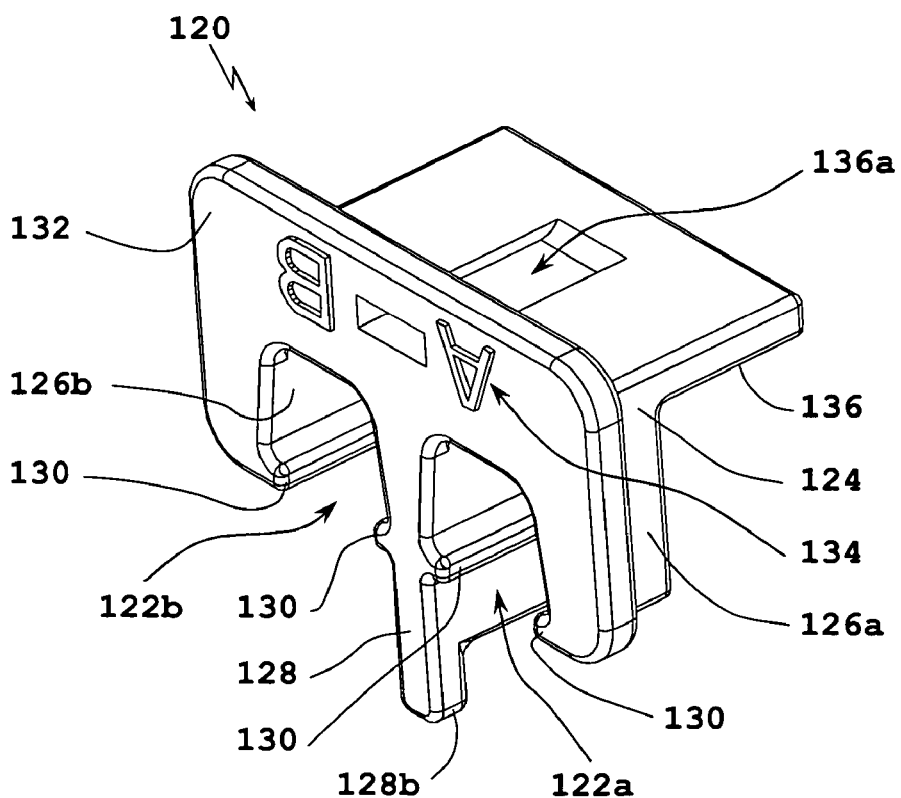
FIG. 5 is a front, bottom perspective view of the yoke member of FIGS. 3 and 4.

Exemplary LC connectors 110 which may be used with connector interface assembly 100 are available from AMP Incorporated, a division of Tyco Electronics Corporation, Middletown, Pa. As seen in FIGS. 1 and 2, each LC connector 110 includes, inter alia, a connector body 112, a latch element 114 supported on connector body 112, and a ferrule member 116 operatively supported on connector body 112 for securing an end of a cable (e.g., fiber optic cable) thereto.

As seen in FIGS. 3-7, duplex connector assembly 138 of connector interface assembly 100 further includes a clip or yoke member 120 configured and adapted to operatively releasably support at least a pair of LC connectors 110 thereto. In use, yoke member 120 converts a simplex assembly (i.e., a singe LC connector 110 application) into a duplex connector assembly (i.e., an application using a pair of LC connectors 110). Yoke member 120 includes a pair of channels 122a, 122b configured and adapted to selectively receive and retain an LC connector 110 therein. Channels 122a, 122b are defined by a base wall 124, a pair of side walls 126a, 126b, and an intermediate wall 128. Lips or ribs 130 may be provided along side walls 126a, 126b and intermediate wall 128 which function to help maintain and/or retain LC connectors 110 within channels 122a, 122b in a snap-fit type engagement. Intermediate wall 128 includes a stabilizer 128a provided at an upper end thereof for engaging a complementary recess 144b formed in passage 144 of first-half housing portion 140 of connector interface assembly 100. (see FIG. 8). A finger 128b extending upwardly from stabilizer 128a, along face plate 132, defines a stop which abuts against a front surface of first-half housing portion 140 of connector interface assembly 100 when duplex connector assembly 138 is introduced into recess 144b thereof.

Yoke member 120 may be provided with a face plate, flange or the like 132 extending from walls 124, 126a, 126b and 128. Indicia 134 may be provided on face plate 132 which identifies and distinguishes channels 122a, 122b from one another. Accordingly, in use, indicia 134 provides the user with an indication as to which LC connector 110 is to be placed in which channel 122a, 122b or as to which LC connector 110 has been placed in channel 122a, 122b. Yoke member 120 may further include a tab 136 extending from base wall 124 in a direction opposite to face plate 132. A recess 136a is formed in a bottom surface of tab 136 for snap-fit engagement with a complementary detent 144a formed in the first-half housing portion of the connector interface assembly. (see FIGS. 8-8B).

Figure 6:
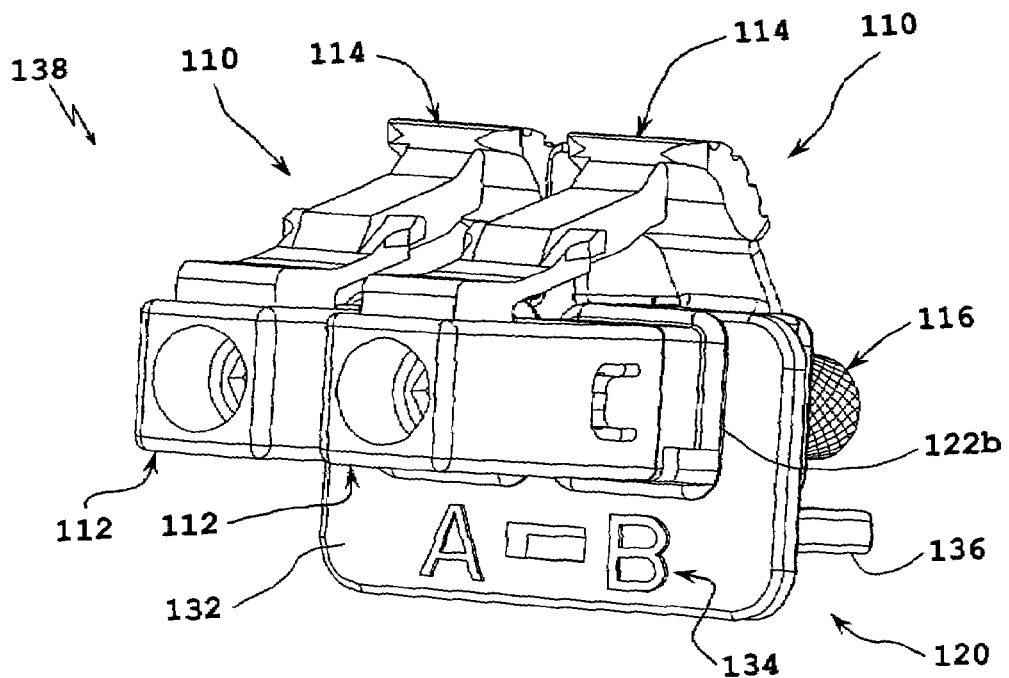
FIG. 6 is a front, perspective view of a duplex connector assembly including the yoke member of FIGS. 3-5 operatively supporting a pair of LC connectors therein.
Figure 7:
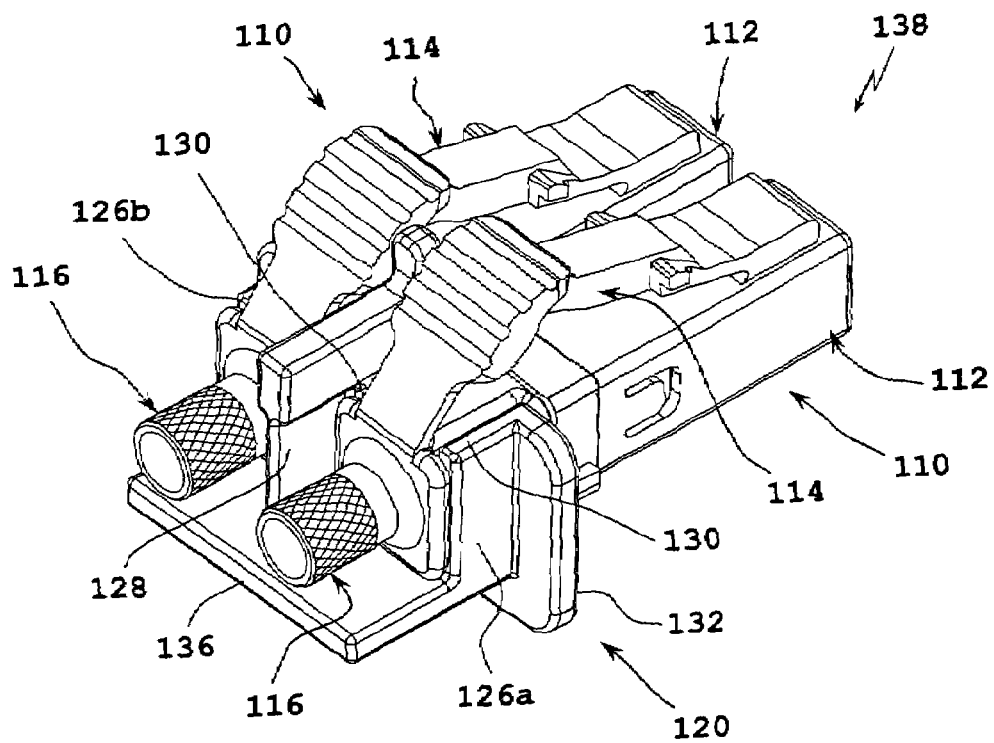
FIG. 7 is a rear, perspective view of the duplex connector assembly of FIG. 6.

As seen in FIGS. 6 and 7, a pair of LC connectors 110 is operatively supported in respective channels 122a, 122b of yoke member 120 thereby forming a duplex connector assembly 138. LC connectors 110 are positioned in channels 122a, 122b such that ferrule members 116 overlie tab 136 of yoke member 120.

Figure 8:
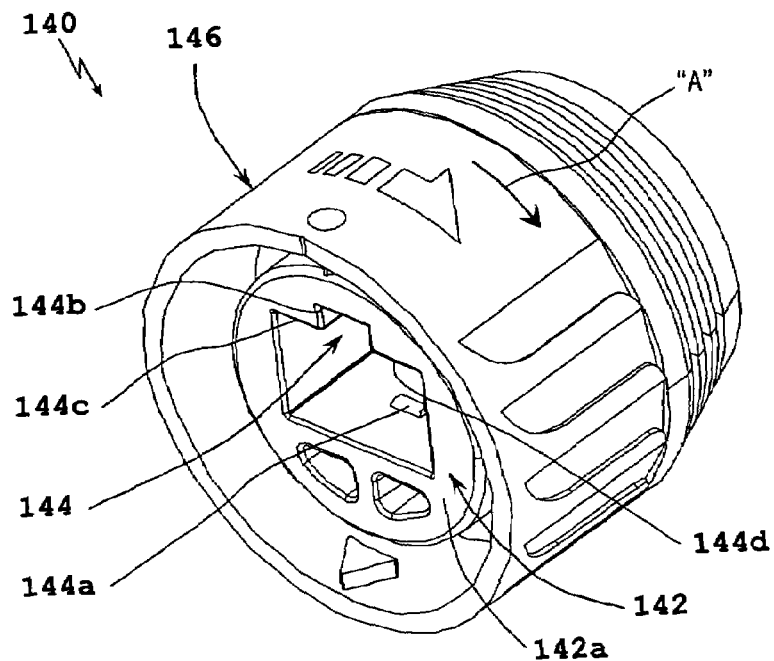
FIG. 8 is a front, perspective view of a prior art first-half portion of a connector interface assembly housing.
Figure 8A:
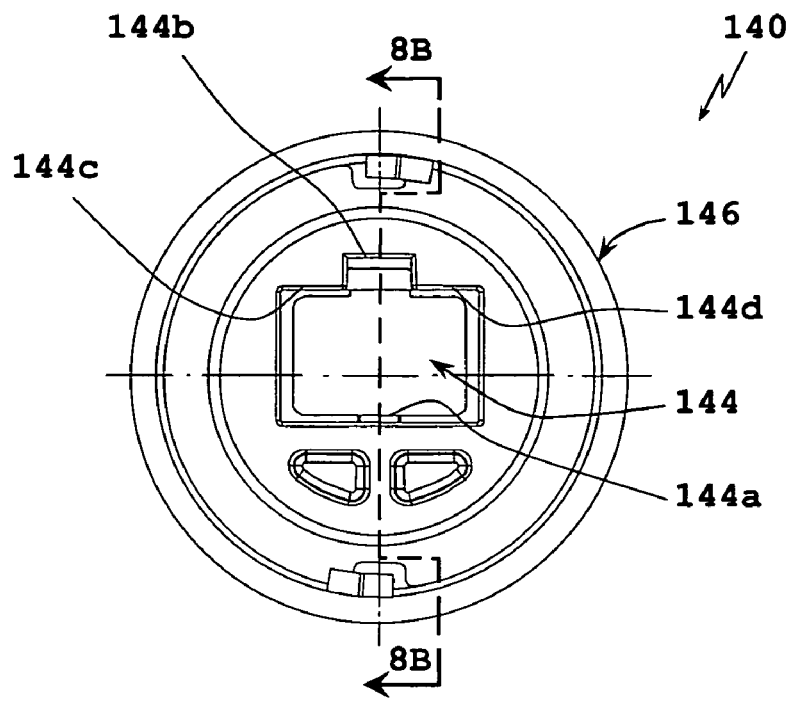
FIG. 8A is a front elevational view of the prior art first-half portion of the connector interface assembly housing of FIG. 8.
Figure 8B:
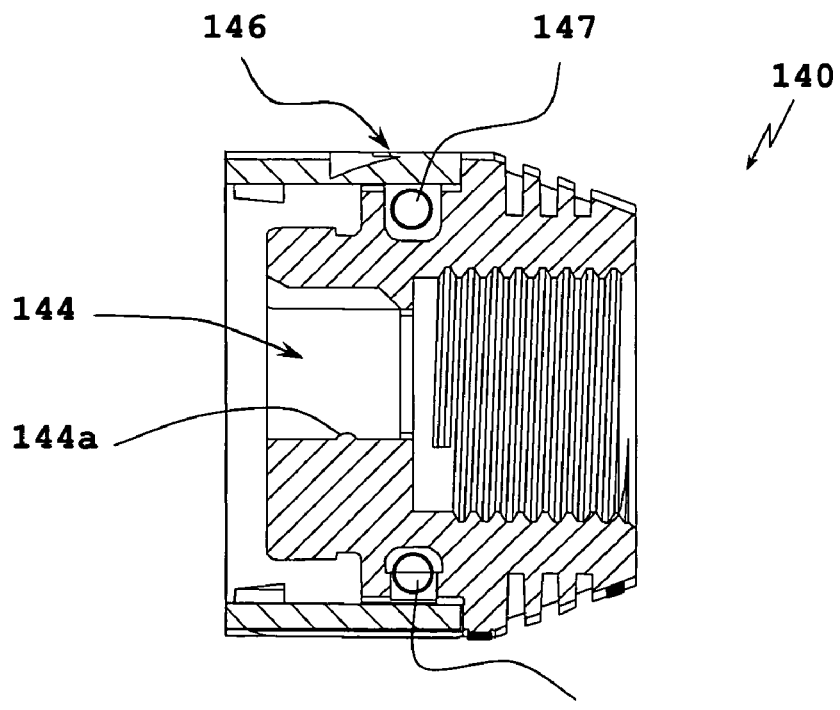
FIG. 8B is a cross-sectional view of the prior art first-half portion of the connector interface assembly housing, as taken through 8B-8B of FIG. 8A.
Figure 11:
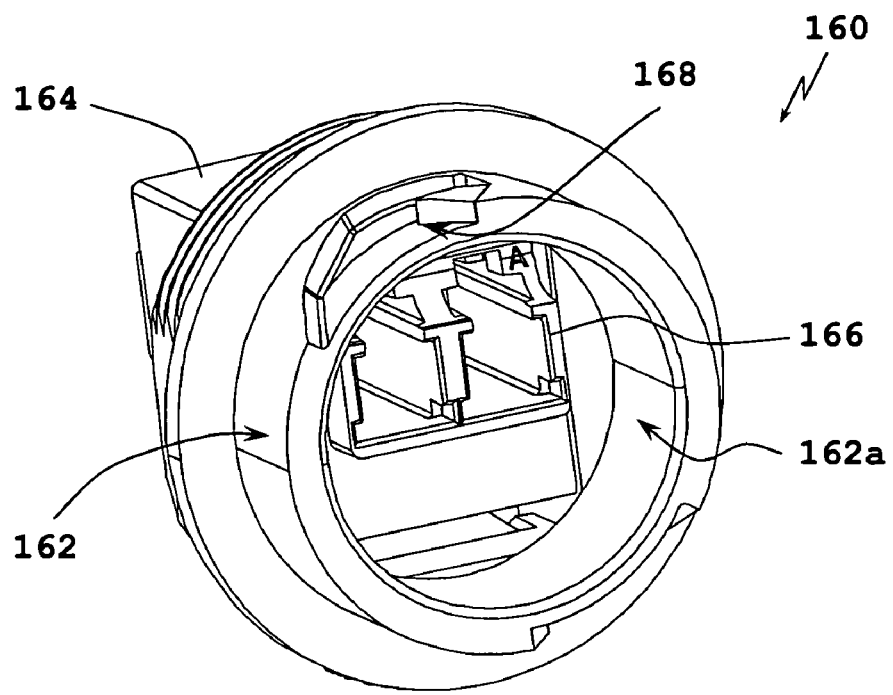
FIG. 11 is a front, perspective view of a prior art second-half portion of the connector interface assembly housing.
Figure 12:
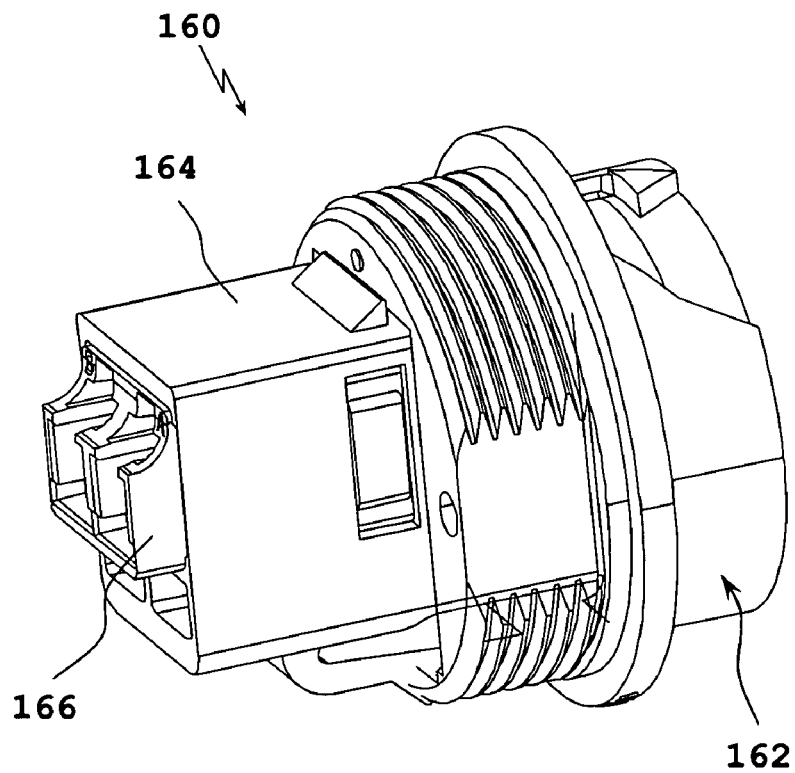
FIG. 12 is a rear, perspective view of the prior art second-half portion of the connector interface assembly housing.

An exemplary connector interface assembly 100, including a first-half housing portion 140, as shown in FIGS. 8, 8A, 8B, and a second-half housing portion 160, as shown in FIGS. 11 and 12, is available from Alden Products Company, Brockton, Mass., and is disclosed in detail in U.S. Pat. Nos. 5,067,909 and 5,167,522, the entire contents of each of which being incorporated herein by reference.

Figure 9:
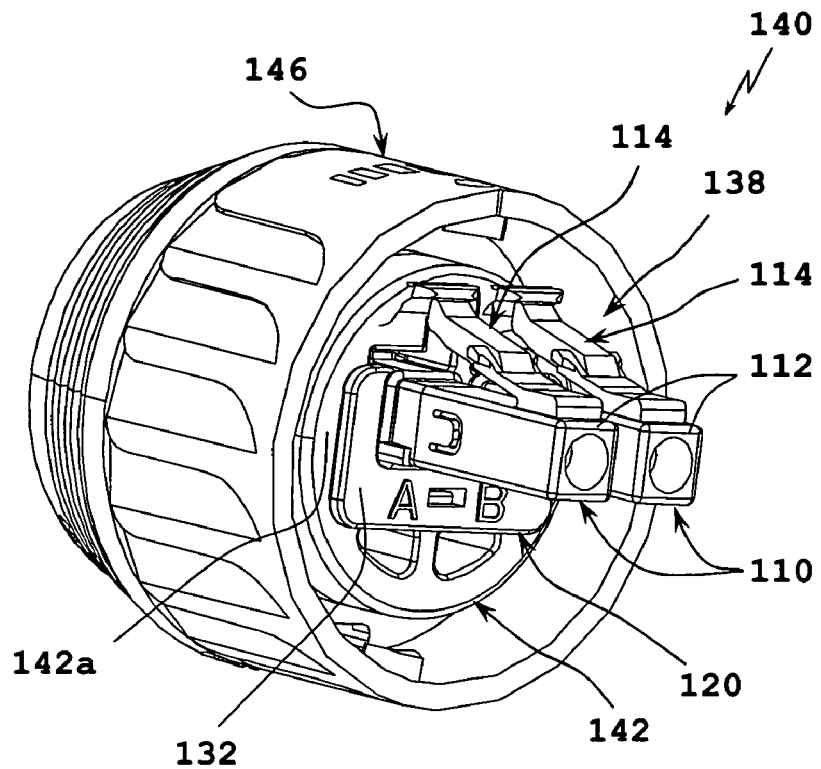
FIG. 9 is a front, perspective view of the first-half portion of the connector interface assembly housing of FIG. 8 including the duplex connector assembly of FIGS. 6 and 7 supported therein.
Figure 10:
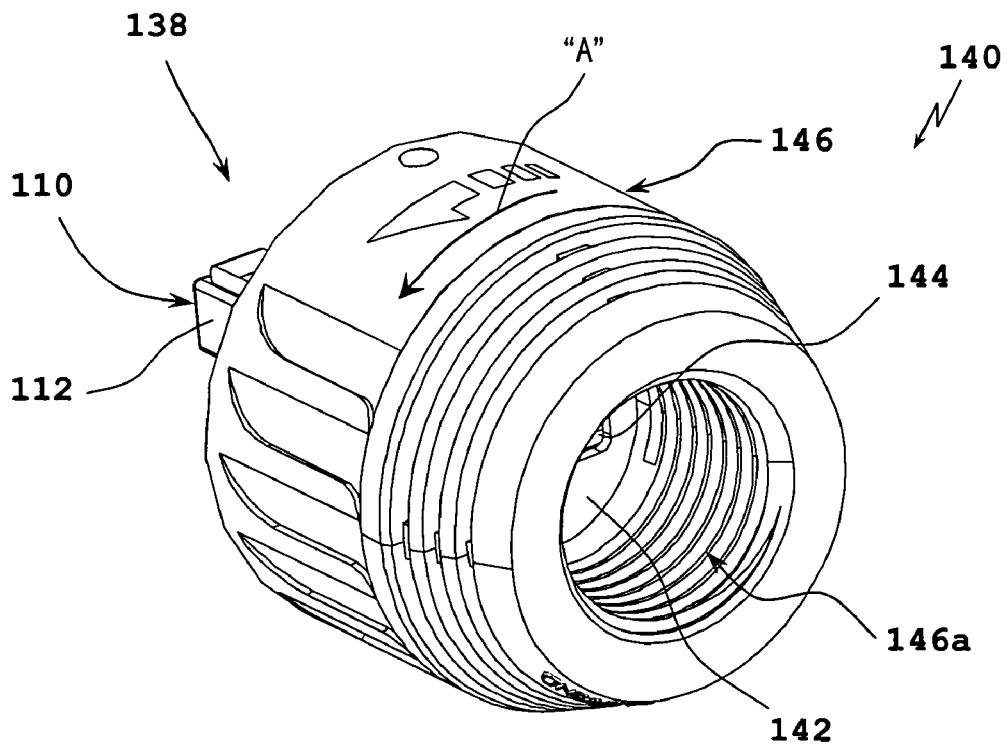
FIG. 10 is a rear, perspective view of the first-half portion of the connector interface assembly housing of FIG. 9.

Turning now to FIGS. 8-10, a first-half housing portion of connector interface assembly 100, in accordance with the present disclosure, is shown as 140. First-half housing portion 140 includes a central body portion 142 defining a passage 144 formed therein which is configured and adapted to selectively receive and retain duplex connector assembly 138. In particular, passage 144 is configured and adapted to receive tab 136 of yoke member 120 and ferrule members 116 of LC connectors 110 therein. In an exemplary embodiment, passage 144 is configured and sized to selectively receive an RJ45 connector or plug therein.

As seen in FIG. 9, duplex connector assembly 138 is inserted into passage 144 until face plate 132 of yoke member 120 is in close proximity to or in contact with a front surface 142a of central body portion 142. Passage 144 includes a detent 144a projecting from a surface thereof for snap-fit engaging recess 136a formed in tab 136 of yoke member 120. To assure that LC connectors 110 are properly inserted into passage 144 of first-half portion 140, passage 144 includes a recess 144b formed in a surface thereof and is configured and adapted to receive at least a stabilizer 128a of intermediate wall 128 of yoke member 120 therein.

With continued reference to FIGS. 8-10, first-half housing portion 140 of connector interface assembly 100 includes an outer annular collar 146 rotatably supported on central body portion 142. Desirably, as seen in FIG. 8B, a coil spring 147 may be provided between central body portion 142 and annular collar 146 for biasing the relative position of annular collar 146 to central body portion 142. In particular, a first end of coil spring 147 is operatively connected to annular collar 146 and a second end of coil spring 147 is operatively connected to central body portion 142. As seen in FIG. 10, a rear or proximal end of annular collar 146 includes an opening 146a configured and adapted to permit passage of cabling, e.g., fiber optic cabling and the like, (not shown) therethrough.

As seen in FIGS. 11 and 12, second-half housing portion 160 of connector interface assembly 100 includes a cylindrical body 162 configured and dimensioned to receive central body portion 142 of first-half housing portion 140 therein and to be inserted or received into annular collar 146 of first-half housing portion 140. Cylindrical body 162 defines a lumen or passage 162a therethrough.

Reference may be made to U.S. Pat. Nos. 5,067,909 and 5,167,522 for a detailed discussion of the features, use and operation of first-half housing portion 140 and second-half housing portion 160. Generally, in operation, first-half housing portion 140 mates with second-half housing portion 160 in a bayonet-type manner.

In accordance with the present disclosure, second-half housing portion 160 of connector interface assembly 100 includes a coupler 164 operatively supported in passage 162a of cylindrical body 162. Coupler 164 is configured and adapted to support at least one connector receptacle 166 therein. Exemplary couplers 164 are available from AMP Incorporated, a division of Tyco Electronics Corporation, Middletown, Pa.

Each connector receptacle 166 is configured and adapted to selectively receive a corresponding portion of a complementary LC connector 110 in either end thereof, e.g., in an end thereof disposed within passage 162a of cylindrical body 162 and/or in an end thereof located without passage 162a of cylindrical body 162. Each receptacle 166 may be configured and adapted to depress latch elements 114 of LC connectors 110. Desirably, latch elements 114 of LC connectors 110 are depressed by 140 and thus may be rendered non-functional.

Turning now to FIGS. 13-14, the operation of mating first-half housing portion 140 and second-half housing portion 160 of connector interface assembly 100 is shown and will be described. Desirably, first-half housing portion 140 and second-half housing portion 160 mate with one another in a bayonet-type engagement.

Initially, duplex connector assembly 138 is operatively inserted into passage 144 of first-half housing portion 140, as described above. With first-half housing portion 140 so configured and/or arranged, first-half housing portion 140 is oriented relative to second-half housing portion 160 such that connector bodies 112 of LC connectors 110 are aligned with receptacles 166 of coupler 164 of second-half housing portion 160. As so aligned, first-half housing portion 140 and second-half housing portion 160 are approximated toward one another such that LC connectors 110 enter receptacles 166.

Further approximation of first-half housing portion 140 and second-half housing portion 160 toward one another results in complete mating of LC connectors 110 in receptacles 166.

It is to be understood that the foregoing description is merely a disclosure of particular embodiments and is no way intended to limit the scope of the invention. Other possible modifications will be apparent to those skilled in the art and all modifications are to be defined by the following claims.

What is claimed is:

1. A connector interface assembly for fiber optic cabling, the connector interface assembly comprising:
    a first-half housing portion including a central body portion defining a passage therethrough;
    a second-half housing portion connectable to the first-half housing portion, the second-half housing portion including a body defining a passage therethrough, the body being configured and dimensioned for receiving the central body portion of the first-half housing portion therein; and
    a duplex connector assembly operatively supportable in the passage of the central body portion of the first-half housing portion, the duplex connector assembly including a pair of fiber optic connectors, each connector including a connector body and being configured and adapted to terminate a fiber optic cable,
    wherein a distal end portion of the fiber optic connectors is receivable in a corresponding complementary connector receptacle provided in the second-half housing portion.

2. The connector interface assembly according to claim 1, wherein the duplex connector assembly comprises a yoke member configured and adapted to selectively support the pair of fiber optic connectors, the yoke member includes a pair of channels each configured and dimensioned to selectively receive a fiber optic connector therein in a snap-fit engagement.

3. The connector interface assembly according to claim 2, wherein at least a portion of the yoke member is positionable in the passage of the central body portion of the first-half housing portion.

4. The connector interface assembly according to claim 1, wherein the fiber optic connectors are LC connectors.

5. The connector interface assembly according to claim 1, wherein the body of the second-half housing portion comprises a cylindrical shape.

6. The connector interface assembly according to claim 1, further comprising:
   a coupler operatively supported on the second-half housing portion; and
   a connector receptacle operatively supported in the coupler, wherein a first end of the connector receptacle is configured and adapted to receive the fiber optic connectors therein upon mating of the first-half and second-half housing portions to one another.

7. The connector interface assembly according to claim 6, wherein the first end of the connector receptacle is disposed within the passage of the second-half housing portion.

8. The connector interface assembly according to claim 1, wherein the first-half and second-half housing portions connect in a bayonet-type arrangement.

9. In an improved connector interface assembly for fiber optic cabling, wherein the connector interface assembly includes a first-half housing portion connectable with a complementary second-half housing portion, and wherein the first-half housing portion includes a central body portion defining a passage therethrough and the second-half housing portion includes a body defining a passage therethrough, the improvement comprising:
   a yoke member configured and adapted to support a pair of fiber optic connectors, and configured and adapted for insertion into the passage of the central body portion, wherein at least a portion of the yoke member is positionable in the passage of the body of the second-half housing portion.

10. The connector interface assembly according to claim 9, further comprising:
    a duplex connector assembly insertable into the passage of the central body portion, the duplex connector assembly including:
    the yoke member; and
    a pair of fiber optic connectors, each connector including a connector body and being configured and adapted to terminate a fiber optic cable.

11. The connector interface assembly according to claim 9, wherein the yoke member includes a pair of channels each configured and dimensioned to receive a fiber optic connector therein in a snap-fit engagement.

12. The connector interface assembly according to claim 9, wherein a distal end portion of the fiber optic connectors is receivable in a corresponding complementary connector receptacle of the second-half housing portion.

13. The connector interface assembly according to claim 9, wherein the yoke member engages the passage of the central body portion in a snap-fit type engagement.

14. The connector interface assembly according to claim 9, wherein the fiber optic connectors are LC connectors.

15. The connector interface assembly according to claim 9, wherein the yoke member includes:
    a base wall;
    a pair of side walls; and
    an intermediate wall disposed between the side walls, wherein the base wall, the pair of side walls and the intermediate wall define a pair of channels, wherein a fiber optic connector is positionable within each channel of the yoke member.

16. The connector interface assembly according to claim 15, wherein the side walls and the intermediate wall each include a rib for snap-fit engaging the fiber optic connector.

17. The connector interface assembly according to claim 15, wherein the intermediate wall includes a stabilizer provided at an upper end thereof for engaging a complementary recess formed in the passage of the central body portion of the first-half housing portion.

18. The connector interface assembly according to claim 15, wherein a recess is provided in the base wall of the yoke member for snap-fit engaging a detent formed in the passage of the central body portion of the first-half housing portion.

19. A yoke member for insertion into a passage of a first-half housing portion of a connector interface assembly, the first-half housing portion being matable with a complementary second-half housing portion, the yoke member comprising:
    a base wall;
    a pair of side walls; and
    a single intermediate wall disposed between the side walls, wherein the base wall, the pair of side walls and the intermediate wall define a pair of channels, wherein a fiber optic connector is positionable within each channel of the yoke member.

\* \* \* \* \*